(12) United States Patent
Kuil et al.

(10) Patent No.: US 6,793,958 B2
(45) Date of Patent: Sep. 21, 2004

(54) EMULSIFIED FOOD COMPOSITION

(75) Inventors: Gijsbert Kuil, Vlaardingen (NL); Barbara Margaretha Pelan, Vlaardingen (NL); Theo Struik, Vlaardingen (NL)

(73) Assignee: Lipton, Division of Conopco, Inc., Englewood Cliffs, NJ (US)

( * ) Notice: Subject to any disclaimer, the term of this patent is extended or adjusted under 35 U.S.C. 154(b) by 239 days.

(21) Appl. No.: 09/999,044

(22) Filed: Oct. 24, 2001

(65) Prior Publication Data

US 2002/0076476 A1 Jun. 20, 2002

(30) Foreign Application Priority Data

Oct. 27, 2000 (EP) .............................................. 00203738

(51) Int. Cl.[7] .............................................. A23L 1/24
(52) U.S. Cl. ...................................... 426/605; 426/602
(58) Field of Search ................................. 426/602, 605

(56) References Cited

U.S. PATENT DOCUMENTS

| | | | | | |
|---|---|---|---|---|---|
| 2,221,957 A | * | 11/1940 | Straub | ........................ | 426/605 |
| 2,844,469 A | * | 7/1958 | Melnick | ..................... | 426/116 |
| 3,300,318 A | * | 1/1967 | Szczesniak | ................. | 426/605 |
| 3,804,957 A | * | 4/1974 | Purves | ........................ | 426/605 |
| 4,923,707 A | * | 5/1990 | Schoenberg | ............... | 426/602 |
| 5,114,733 A | * | 5/1992 | Quinet | ........................ | 426/605 |
| 5,464,639 A | * | 11/1995 | Clyde et al. | .................. | 426/20 |
| 5,773,072 A | * | 6/1998 | Campbell et al. | ........... | 426/589 |
| 5,958,498 A | * | 9/1999 | Trueck et al. | ............... | 426/605 |
| 5,976,587 A | * | 11/1999 | Yamauchi et al. | .......... | 426/112 |
| 6,231,913 B1 | * | 5/2001 | Schwimmer et al. | ....... | 426/605 |

FOREIGN PATENT DOCUMENTS

| | | | |
|---|---|---|---|
| EP | 0141477 | * | 5/1985 |
| EP | 0 788 747 | | 8/1997 |
| WO | 94/00996 | | 1/1994 |

OTHER PUBLICATIONS

Lowe, B. 1937. Experimental Cookery, 2nd edition. John Wiley & Sons, Inc., London, p. 266–287.*
McGee, H. 1984. On Food and Cooking, The Science and Lore of the Kitchen. MacMillan Publishing Co., New York. p. 348 364.*
Search Report for the corresponding PCT Application No. PCT/EP01/11289.
European Search Report dated Apr. 4, 2001.
Patent Abstracts of Japan, vol. 018, No. 285 (C–1206) and JP 06 054662A.
Patent Abstracts of Japan, vol. 012, No. 455 (C–1206) and JP 63 181972A.

* cited by examiner

Primary Examiner—Carolyn Paden

(57) ABSTRACT

Edible oil-in-water emulsion comprising:
- 35–70% (wt) edible oil
- 0.5–10% (wt) egg yolk derived emulsifier
- 0.3–1.5% (wt) casein
- 65–25% (wt) water,
- wherein at least 60% of the oil droplets has a size of 1–5 $\mu$m. Such a composition preferably has a Stevens value of 60–160, when measured using a Stevens Texture Analyser, at 20° C., after 2 weeks storage at 20° C., using a speed of 2 mm/s and a distance 20 mm.

10 Claims, 1 Drawing Sheet

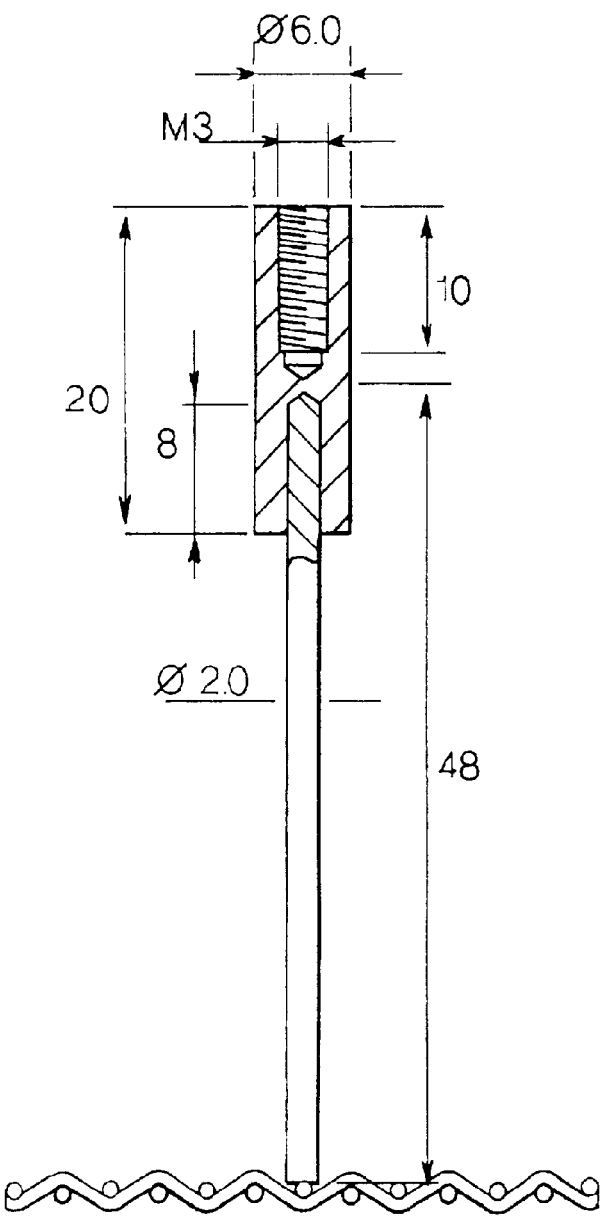
Fig.1a.
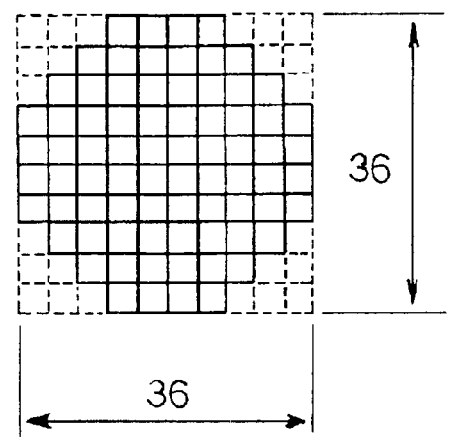
Fig.1.b.

EMULSIFIED FOOD COMPOSITION

FIELD OF THE INVENTION

The present invention relates to an edible, oil-in-water type emulsion having rheological and sensorial properties resembling those of mayonnaise, but which emulsion has a reduced content of oil.

BACKGROUND OF THE INVENTION

Traditional mayonnaise is an oil-in-water type emulsion comprising vegetable oil (70–80%), egg yolk (5–8%), salt, vinegar (to achieve a pH of the water phase of about 4–4.5), mustard, and optionally sugar, pepper and herbs. The oil is generally present as droplets (average size 4–8 µm) dispersed in a water phase. Following the droplet size and the high amount of dispersed phase, a very close packing is obtained. As a result of the close packing and the thin layers of continuous phase separating them, the typical rheological behavior (by consumers perceived as thickness) of mayonnaise is obtained. This is reflected by e.g. a Stevens value of about 80 to 120 (speed 2 mm/s, distance 20 mm, using a typical mayonnaise grid: mesh 7, thread thickness 0.8 mm, mesh width 2.83 mm, see FIGS. 1a and 1b, for the grid when mounted, and the grid itself, respectively).

There is, however, an ever-increasing demand for mayonnaise-type products having a lower content of oil but otherwise still having good sensorial properties and mouthfeel, as are associated with full-fat mayonnaise.

Lowering the content of oil in an otherwise standard mayonnaise-type formulation and processing will result in less dense packing of oil droplets in the continuous phase. As a result of this the formulation will have a dramatically lowered thickness or viscosity as a result, following which it will no longer be spoonable etcetera, and not be acceptable as a mayonnaise-type product.

A solution to this can be to add thickeners to the water phase, such as gums and/or starch. The use of such thickeners can affect flavour and/or mouthfeel. The use of starch can lead to sticky, chewy products.

Another solution to the above problem is to rigorously decrease the size of the oil droplets that are dispersed in the continuous phase. When the droplets are very small (around or less than 1 µm), and the amount of oil is not very low, this may give good result. A disadvantage, although specific equipment will be needed in order to get the extremely small droplets. Disadvantages of this solution is that these very small droplets are very difficult to obtain, as extremely high shear will be needed to obtain the small droplets and the need for additional compounds in order to stabilize the small droplets (the normal amount of 5–8% egg yolk will not be sufficient). An example of this technology has been described in JP 06/054,662 (Kao Corp.). In this reference, an emulsion is disclosed of 10–60% oil in 90–40% water phase, wherein the aqueous phase contains at least one protein in an amount of 1–10% by weight, and wherein not less than 80% of the oil droplets in the emulsion has a particles size not larger than 1 µm (i.e. at least 80% of the oil droplets is equal to or smaller than 1 µm). Preferably, the particle size is in the range of 0.1–1.0 µm. Proteins reported in said reference to be suitable are egg protein, soybean protein, milk protein, and single proteins isolated therefrom. Disclosed examples use ultra high-pressure homogenisers operating at 600 bars for preparation.

JP 63/181,972 (Sonton Shokuhin KK) discloses the use of whey protein concentrates (WPC) for emulsification of acidic oil-in-water type emulsified food products. WPC is used over other protein-containing emulsifiers because of its heat resistance and shape holding ability, in the application as filling/topping on/in bread.

EP 788747 (Nestle) relates to a mayonnaise-like product containing 55–85% oil, and which contains another emulsifier than egg yolk. The compositions according to this reference contain as emulsifier at least 0.1% milk proteins or vegetable proteins, which proteins are heat-denatured to a degree of 70–80%. The denaturation is said to be necessary to obtain a mayonnaise-like product and to avoid gel formation.

SUMMARY OF THE INVENTION

Hence, there is a need for an edible, mayonnaise-like product with a lower amount of oil than conventional mayonnaise, which product resembles (part of) the rheological behavior and/or appearance of full-fat mayonnaise. Preferably, this can be obtained without using starch-based thickeners.

It has now been found that the above can be achieved by an edible composition comprising an oil-in-water emulsion comprising:

35–70% by weight edible oil,
0.5–10% by weight egg yolk derived emulsifier,
0.3–1.5% by weight casein,
65–25% water,
wherein at least 60% of the oil droplets has a size of 1–5 µm.

The above composition has preferably a Stevens value of 60–160, preferably 75–140 (when measured at 20° C., after 2 weeks storage at 20° C., speed 2 mm/s, distance 20 mm, mayonnaise grid (mesh 7, thread thickness 0.8 mm, mesh width 2.83 mm, see FIGS. 1a and 1b, for the grid when mounted, and the grid itself, respectively).

Emulsification is preferably obtained using a high-pressure homogeniser operating at a pressure of less than 600 bars, more preferably less than 400 bars. There is no need for very small droplets, which can only be obtained using specific equipment (e.g. ultra high-pressure homogenisers operating at 600 bar). Suitable pressures are in the range of 50 to 300 bars, e.g. 100 or 200 bars.

In such a composition, casein, unlike other proteins, seems to perform a unique function. Without wishing to be bound by theory, it is believed the properties of the casein are such that under the conditions as are specific for mayonnaise (pH 3.0–5.0) and in the presence of oil droplets of a suitable size, aggregates or clusters can be formed in which a casein "particles" are surrounded by various oil droplets, as can be shown by micrographs. Without wishing to be bound by any theory, the so-formed clusters have apparently a thickening effect on the emulsion. This thickening effect (which surprisingly does not result in elastic properties, which are undesired) is such that with a reduced amount of oil, an increased level of water and the addition of an effective amount of casein, a product can be obtained with a very much similar appearance and/or rheological behavior (e.g. spoonable character) as standard mayonnaise.

In the compositions according to the invention, the droplet size is somewhat smaller than for conventional mayonnaise (about 4–8 µm), but not as small as in techniques as are described in the prior art (e.g. JP 06/054662: 0.1–1 µm). Due to the majority of the oil droplets being "clustered" around the casein particles, many conventional droplet-size measurement techniques are not very suitable. A technique that is suitable is computerised image analysis of micrographs.

With respect to casein, it is submitted that this particular protein seems to behave in a specific way, thus enabling the "clustering" to occur. This implies that (majority of) the casein would be present as globules with part of the oil droplets clustered on the surface of the casein globules. Part of the oil droplets would then not be clustered with the protein globules, but emulsified in the aqueous phase.

It is submitted that replacing casein with e.g. whey protein does not result in said clustering. This may be due to the different structure of the proteins. Casein is under mayonnaise conditions (e.g. pH 4.0–4.8) present in a random coil form or in other words as a disorganised, insoluble protein. Whey protein on the other hand, is a globular, soluble protein, which unfolds under heating. Excessive heating will cause denaturation. Neither before nor after denaturation will the whey protein be capable of forming clusters with oil droplets. Following this, the presence of casein is essential in the present invention. However, a small amount of whey protein (next to casein) is not detrimental. Hence, instead of pure casein protein, it is possible to use skimmed milk protein (SMP), which is a commercially available product, usually consisting of about 35% protein, of which about 80% is casein and about 20% is whey. Casein is preferably not heat denatured. Like SMP, buttermilk protein (BMP) may be used.

BRIEF DESCRIPTION OF THE DRAWINGS

FIGS. 1a and 1b show the mounted grid and grid, respectively, used to determine the Stevens value for the composition of this invention.

DETAILED DESCRIPTION OF THE INVENTION

Preferred egg yolk derived emulsifiers in this invention are (fresh) egg yolk, stabilised egg yolk (SEY), enzymatically treated egg yolk, dried egg yolk, salted egg yolk, or egg yolk treated in any other way as known in the art of egg yolk emulsifiers to yield egg-yolk derived emulsifiers, e.g. lecithin. When egg yolk is used in the compositions according to the invention, a suitable amount is 0.5–10%, preferably 1–8% (wt), more preferably 3–7% (wt). When egg yolk-derived products are chosen (e.g. dried egg yolk) then the amount should be calculated on the basis of raw egg yolk. The presence of egg yolk is beneficial for both taste and emulsification of the oil droplets.

Although the composition according to the invention may be achieved with a wide variety of fat levels, it is preferred that the composition according to the invention comprises from about 40–65% (wt) of oil, or even more preferred from about 45–60% (wt) of oil. Preferred oils are triglyceride oils of vegetable origin, such as sunflower, corn, olive, soy bean, palm, sesame, safflower or linseed oil.

The casein utilised in the present invention is preferably added as Skimmed Milk Powder (SMP), containing 35% protein of which about 28% casein and 7% whey protein. The amounts of casein employed in the compositions according to the invention are (calculated as pure casein) between 0.1 and 2%, preferably 0.2–1.5% by weight, based on the total composition.

As the emulsions according to the invention are intended as a mayonnaise-like product, but with a lower amount of oil present, the emulsions according to the invention may further comprise ingredients which are commonly used in mayonnaise, such as acetic acid, citric acid, 0.1–7% mustard, 0.5–2% salt, pepper and sugar. As a result of any organic acid present, the pH of the water phase of the emulsion will usually be 3.0–5.0.

Optionally, the compositions according to the invention may further comprise 0.02–0.4% of natural gums, and/or sugars.

The emulsions according to the invention may suitably be prepared by a process involving the following steps:
mix all the ingredients except for the oil and the egg yolk derived emulsifier,
optionally pasteurise,
add the egg yolk-derived emulsifier,
add the oil,
homogenise, e.g. in a high pressure homogeniser at pressures of more than 50 bar, preferably at least 100 bar (preferably less than 250 bar),
cool and fill.

The invention is further illustrated by the following examples, which are to be understood as non-limiting.

EXAMPLES

Five formulations have been preferred according to the compositions as are set out in table 1.

Processing Comparative Example

Disperse powders in cold water using Turrax, add vinegar, lactic acid, pasteurise the water 75° C. for 2 min. in waterbath. Cool water phase to ca 55° C. Add SEY, followed by oil (55° C.), using stirrer. Adjust the pH of this pre-emulsion to 3.9 with lactic acid. Turrax for a few seconds. Homogenise in colloid mill (Gronfa) at 50° C. Fill jars, allow to cool.

Processing Example 1, 3

Disperse powders in cold water using Turrax, add vinegar, lactic acid, pasteurise the water 75° C. for 2 min. in waterbath. Cool water phase to ca 55° C. Add SEY, followed by oil (55° C.), using stirrer. Adjust the pH of this pre-emulsion to 3.9 with lactic acid. Turrax for a few seconds. Homogenise in high pressure homogeniser (APV) at 100 Bar, at 50° C. Fill jars, allow to cool.

Processing Example 2

Disperse powders in cold water using Turrax, add vinegar, lactic acid, pasteurise the water 75° C. for 2 min. in waterbath. Cool water phase to ca 20° C. Add SEY, followed by oil (20° C.), using stirrer. Adjust the pH of this pre-emulsion to 3.9 with lactic acid. Turrax for a few seconds. Homogenise in a high pressure homogenisator (APV) two times at 200 Bar, at 50° C. Fill jars, allow to cool.

Processing Example 4

Disperse powders in cold water using Turrax, add vinegar, lactic acid, mustard, pasteurise the water 75° C. for 2 min. in waterbath. Cool water phase to ca 20° C. Add SEY, followed by oil (20° C.), using stirrer. Adjust the pH of this pre-emulsion to 3.9 with lactic acid. Turrax for a few seconds. Homogenise in high pressure homogeniser (APV) at 100 Bar at 20° C. Fill jars.

Of the resulting products, Stevens values have been measured (which give an indication of the firmness/spoonability). Description measurement Stevens value: the firmness of all products at 20° C. (after storage at 20° C. for two weeks) was measured using a Stevens Texture Analyser (2 mm/sec, 20 mm depth, mayonnaise grid (mesh 7, thread thickness 0.8 mm, mesh width 2.83 mm, see FIG. 1), and is quoted herein as the Stevens value (in g). The accuracy of this measurement in all cases is ±10 g.

TABLE 1

| Ingredients | | Comparative (%) | Example 1 (%) | Example 2 (%) | Example 3 (%) | Example 4 (%) |
|---|---|---|---|---|---|---|
| Oil | Sunflower oil | 50 | 50 | 55 | 45 | 50 |
| Egg Yolk | Enthoven, 92-8 | | | | | 6 |
| Fermented Egg Yolk | Enthoven, 92-8 | 6 | 6 | 6 | 6 | |
| Skimmed Milk Powder | PROMEX, Coberco | 2 | 2 | 2 | 2 | 3.5 |
| Alcohol vinegar | 12% | 2 | 2 | 2 | 2 | 2 |
| Mustard | Kühne | | | | | 2 |
| Sucrose | | 2.75 | 2.75 | 2.75 | 2.75 | 2.75 |
| Salt | | 0.25 | 0.25 | 0.25 | 0.25 | 0.25 |
| Xanthan gum | Keltrol F | 0.2 | 0.2 | | 0.3 | 0.2 |
| Lactic acid | 50% solution | 0.59 | 0.59 | 0.8 | 0.8 | 0.89 |
| Water | | 36.21 | 36.21 | 31.2 | 40.9 | 32.41 |
| Total | | 100 | 100 | 100 | 100 | 100 |
| Homogenisation Details: | | Colloid mill | HPH 100 bar | HPH 2 × 200 bar | HPH 100 bar | HPH, cold 100 bar |
| Stevens value after 2 weeks storage at 20° C. | | 23 | 84 | 134 | 104 | 99 |

What is claimed is:

1. Edible oil-in-water composition in the form of an emulsion, which emulsion comprises:

35–70 % (wt) edible oil 0.5–10 % (wt) egg yolk derived emulsifier 0.1–2.0% (wt) casein 65–25 % (wt) water, wherein at least 60% of the oil droplets has a size of 1–5 μm and further wherein the emulsion has a Stevens value of 60–160, when measured using a Stevens Texture Analyser, at 20° C. after 2 weeks storage at 20° C., using a red or 2 mm/s and a distance 20 mm, mayonnaise grid as in FIG. 1.

2. Composition according to claim 1, wherein the emulsion is obtained using a high pressure homogeniser.

3. Composition according to claim 1, wherein the egg yolk derived emulsifier comprises egg yolk or stabilised egg yolk (SEY).

4. Composition according to claim 3, wherein the egg yolk is present in an amount of 1–8% (wt).

5. Composition according to claim 1, wherein the amount of oil is 40–65% (wt).

6. Composition according to claim 5, wherein the amount of oil is 45–60% (wt).

7. Composition according to claim 1, wherein the amount of casein is 0.2–1.5% (wt).

8. Composition according to claim 1, further comprising one or more of: acetic acid, citric acid, 0.1–7% mustard, 0.5–2% salt, pepper.

9. Composition according to claim 1, wherein the water phase of the emulsion has a pH of 3.0–5.0.

10. Composition according to claim 1, wherein the casein is present as particles with part of the oil droplets clustered on the surface of the casein particles.

* * * * *